United States Patent [19]

Del Vento

[11] Patent Number: 4,701,338

[45] Date of Patent: Oct. 20, 1987

[54] SALAD DRESSING AND METHOD OF MAKING

[76] Inventor: Maria Del Vento, 407 Netherwood Crescent, Altamonte Springs, Fla. 32714

[21] Appl. No.: 837,772

[22] Filed: Mar. 10, 1986

[51] Int. Cl.$^4$ ................................................ A23L 1/24
[52] U.S. Cl. ..................................... 426/602; 426/613
[58] Field of Search ............... 426/601, 589, 613, 606, 426/602

[56] References Cited

U.S. PATENT DOCUMENTS

| | | | |
|---|---|---|---|
| 2,916,383 | 12/1959 | Nasarevich | 426/589 |
| 4,129,663 | 12/1978 | Jamison | 426/602 |
| 4,299,856 | 11/1981 | Zirbel | 426/589 |
| 4,572,836 | 2/1986 | Babal | 426/613 |

*Primary Examiner*—Jeanette Hunter
*Attorney, Agent, or Firm*—Charles R. Rhodes; Judith E. Garmon

[57] ABSTRACT

A multi-step process for making an oil and vinegar salad dressing wherein the ingredients are blended and incorporated into each other by means of a carefully controlled application of heating, cooling and resting steps with agitation. The resulting product demonstrates increased shelf stability and a significantly improved flavor.

2 Claims, No Drawings

SALAD DRESSING AND METHOD OF MAKING

BACKGROUND AND SUMMARY OF PRESENT INVENTION

The present invention is related to salad dressings having a base of vegetable oil and vinegar with selected seasonings incorporated therein. Many approaches have been taken to producing salad dressings with an increased shelf life but without loss of flavor. In the past, problems with shelf life and stability of such vinegrette dressings have been compounded when attempts have been made to add cheese or other such products to the dressing. These dairy products require increased levels of preservatives the addition of which can destroy the natural flavor and quality of the finished product.

In the present disclosure the process includes a carefully controlled application of a combination of heat and agitation as the individual ingredients are added to the mixture, along with the addition of a natural preservative. The process was developed in an attempt to maximize the extraction of flavor fiber and trace elements from the components of the dressing, all of which components are naturally occurring products. Applied as described below, the process results in a food product having a substantially improved stability and shelf life, along with improved taste appeal. All of these factors are being accomplished by use of naturally occurring ingredients and without the substantive use of chemical additives and preservatives. It is therefore a primary objective to produce a food product by a process of combining natural ingredients in such a way as to break down the fiber components and trace elements of the ingredients and thereby gain a maximum release of flavor. A further objective is the production of such a food product by use of natural ingredients but with good stability and increased shelf life.

DETAILED DESCRIPTION OF THE PREFERRED PROCESS OF THE PRESENT INVENTION

The preferred major ingredients used in making the salad dressing are an oil and vinegar base, with the addition of cheese, herbs and selected seasoning. The preservative is a grapefruit derivative. The process and ingredients are below. However, it must be recognized that the quantities which are given are for a preferred mixture, but may be varied somewhat according to desired flavor.

The proportions given are relative to each other and if varying the total quantity of the finished product, one must be aware of the necessity to increase or decrease each ingredient proportionally.

The application of heat and agitation may be varied to some extent, but such variations are within a relatively narrow range of temperature and time. It is believed that the applications of heat and agitation as described herein fall within the preferred limits. However, it is obvious that some variations might fall outside the examples given, but remain within anticipated parameters.

In the preferred embodiment, which is for an "Italian" type vinegrette dressing, but which is applicable to many other types of food products, the process is performed as described below. Using a stainless steel or other non-reactive commercially-sized mixing device, which generally comprises a container having a mixing shaft and a propellant plate therein and a top closure means, proceed by:

Step (1) slowly agitating approximately 64 fluid ounces of red wine vinegar in a partially closed container, while heating the vinegar to a temperature in the range of 95° to 100° F.;

Step (2) incorporating 6 ounces dry weight of sugar, preferably refined, into the vinegar, using slow agitation for four to five minutes, while maintaining the temperature of the mixture at 95° to 100° F.;

Step (3) incorporating 256 fluid ounces of bleached and deodorized vegetable oil, preferably soybean oil, with agitation, into the vinegar mixture until the hard fats are removed and the oil is purified;

Step (4) reducing the temperature of the resulting primary oil and vinegar mixture to 80° to 85° F.;

Step (5) incorporating 0.5 ounces dry weight of whole thyme under slow agitation for five to eight minutes, followed by allowing the mixture to set at rest for 20 to 25 minutes, while maintaining the 80° to 85° F. temperature to extract the flavor from the fiber cells of the thyme;

Step (6) grinding 2 ounces dry weight of whole dried basil, followed by incorporating the ground basil by slow agitation into the primary vinegar mixture for five to eight minutes at 80° to 85°;

Step (7) reducing the temperature of the primary mixture to ambient room temperature;

Step (8) removing 200 ml of the primary mixture obtained from steps one through seven and placing it in a sterile glass tube and heating to 80° to 85° F. before adding 2 ounces dry weight of ground oregano to the 200 ml of heated vinegar;

Step (9) allowing the resulting 200 ml mixture of vinegar and oregano to set at rest without additional heat, for 20 to 25 minutes to extract the flavor of the oregano;

Step (10) incorporating the 200 ml mixture of vinegar and oregano, under agitation for one to two minutes, into the primary mixture;

Step (11) removing a second 200 ml portion of the mixture produced by Steps 1 through 9, and after heating to a temperature of 80° to 85° F., dissolving 8 ounces dry weight table salt and 6 ounces dry weight, of Accent TM brand flavor enhancer therein, under agitation for two to three minutes in a separate blender and returning to the primary mixture;

Step (12) mixing and grinding, in a separate blender, for two to five minutes, 6 ounces dry weight of granulated garlic and 12 ounces dry weight of parmesan cheese;

Step (13) incorporating a natural preservative, preferably such as a grapefruit seed extract, in amount of 0.125% by dry weight of the garlic and cheese mixture into the garlic and cheese mixture by blending as in Step 12;

Step (14) simultaneously incorporating the garlic, cheese and preservative mixture of Steps twelve and thirteen into the primary mixture and agitating for four to six minutes at a temperature of 80° to 85° F.;

Step (15) closing the vessel and allowing the completed mixture to cool to ambient temperature.

Step (16) The finished product should be bottled and sealed according to conventional methods. It is then stored at a temperature in the range of 50° to 75° F.

Looking at the individual steps, it is seen that the process is primarily that of combining a variable agitation speed with a variable temperature control as the individual ingredients are added to the mixture. It is anticipated that the mixing device, such as a blender, will be of a commercial nature, particularly of a type used in restaurant food preparation. The blender includes a mixing shaft and a propellant plate of approximately four inches in diameter within a container. The top closure means is of a type that can be variably positioned from fully open to fully closed. The speed of agitation on most such equipment is controlled by switches designated as slow, medium and high-or variations thereof. Temperature controls on the blender are accomplished by heating elements built into the blenders by the original manufacturer. As disclosed herein, Step 1 begins with the slow agitation and heating of approximately 64 fluid ounces of red wine vinegar. It is obvious that other types of vinegars could be used but the red wine derivative vinegar is preferred because of the smoothness of taste and its ability to interact and blend with the other ingredients. The second step involves the addition of approximately 6.0 ounces, dry weight, of sugar into the heated vinegar. Although a variety of sugars might be used, it is preferred that it be of a refined nature because refined sugars will more easily dissolve and blend at lower temperatures. Step 3 is the incorporation of approximately 256 fluid ounces of vegetable oil. The preferred oil is a soybean derivative, commercial grade No. 1 which has been bleached and deodorized. The oil is slowly incorporated into the vinegar and sugar mixture until the hard fats have been removed. The sugar stabilizes the C.H.O. chain of the soybean oil which improves the stability of the product.

Step 4 begins the process of adding herbs, spices and flavorings to the primary mixture of vinegar, oil and sugar. The first such addition is that of 0.5 ounce of whole thyme to the primary mixture which has reached a temperature of 80 to 85° F. After a slow agitation period of approximately four to five minutes, the mixture is allowed to rest for twenty to twenty-five minutes while maintaining the temperature of 80 to 85° F. The resulting permits the maximum extraction of flavor from the fiber cells of the thyme. It has been shown that higher or lower temperature ranges at this point result in a reduction of the flavor extraction.

In Step 5, 2.0 ounces of whole dried basil is ground in a separate grinder and then incorporated under slow agitation for five to eight minutes. This step is also performed with the mixture being at approximately 80 to 85° temperature to maximize flavor extraction. At the end of the agitation stage, the mixture is allowed to rest and is reduced to ambient room temperatures.

When the primary mixture has been reduced to ambient temperature, 200 ml of the mixture is removed to a sterile pyrex tube and reheated to a temperature of 80 to 85° F. Two weight ounces of oregano is then finally ground and incorporated into the 200 ml of heated materials. This secondary mixture is then allowed to rest for twenty to twenty-five minutes before being reincorporated into the primary mixture. The oregano, which is a natural herb, contains small trace elements of amino acids and protein in fibers. The full release of these amino acids and protein components substantially improves the flavor of the natural oregano, thus resulting in a highly improved flavor in the overall product. When the 200 ml secondary mixture is reincorporated into the primary mixture, it is done under agitation at a normal, or medium, speed for approximately one to two minutes. After this reincorporation step, a second 200 ml mixture is removed from the primary mixture and is mixed with approximately 8.0 ounces dry weight of table salt and 6 ounces dry weight of Accent TM Brand flavor enhancer in a separate blender. When the salt and flavor enhancer have been fully dissolved and the liquid is at approximately 80 to 85° F,, the 200 ml mixture is then reincorporated into the primary mixture under agitation for approximately two to three minutes. Accent TM is the brand name of a monosodium glutamate based flavor enhancer produced and sold by Grocery Group, Pet, Inc. of St. Louis, Mo..

It is at this point that a mixture of parmesan cheese, granulated garlic, and grapefruit seed extract is made. The cheese, garlic, and extract preservative are ground and blended together and then transferred into the primary mixture. The mixture is then agitated for four to six minutes at a temperature of 80 to 85° F. The finished product is then reduced to ambient room temperature in a closed vessel. As stated above in Step 16, the finished product should be bottled and sealed according to conventional methods. Storage is preferably at a temperature range of 50 to 75° F.

The grapefruit seed extract acts as a natural preservative, and substantially eliminates the necessity of adding chemical preservatives to further increase shelf life. The preferred extract is that sold under the trademark DF-100 ®, manufactured and sold by Chemie Research and Manufacturing Co., Inc., of Casselberry, Fla.. The preservative DF-100 ® is basically an extract of grapefruit seed and pulp, and further includes small amounts of ascorbic acid, amino acid, dextrose, glycerine, and proplylene glycol.

Although a relatively narrow range of processing temperatures is given above, these ranges should be adhered to substantially in order to preserve flavor, stability, and color. Experiments at processing under agitation without heat resulted in a mixture that lacked stability, demonstrated separation of components, and decreased flavor. Use of cold processing also resulted in a failure to remove the hard fats of the vegetable oils. On the other hand, increasing the heat of processing to a range of 140° to 150° F. resulted in decreased flavor and discoloration. Processing in the range of 80° to 100° F., however, proved to be critical to maximizing extraction of fiber trace elements and flavor from the components.

As previously emphasized, a wide number of variables may be adjusted in the ingredients and process above while remaining within the scope of the claims below.

What is claimed is:

1. A process for preparing a food product of the type used for dressings on salads, vegetables and the like, wherein the ingredients are combined, using a chemically nonreactive container, by a process including the steps of:

using a stainless steel or other chemically nonreactive container having a mixing shaft, a propellant plate, and a top closure means, combine the following ingredients by:

(a) slowly agitating 64.0 fluid ounces of wine vinegar in a partially closed container, while heating to a temperature in the range of 95° to 100° F.;

(b) incorporating 6.0 ounces dry weight of sugar into the vinegar, using slow agitation for four to five minutes, while maintaining the temperature of the mixture in the range of 95° to 100° F.;

(c) incorporating 256.0 fluid ounces of bleached and deodorized vegetable oil, by agitation into the heated vinegar mixture to form a primary oil and vinegar mixture;

(d) reducing the temperature of said primary oil and vinegar mixture to the range of 80° to 85° F.;

(e) incorporating 0.5 ounces dry weight of whole thyme by slow agitation for four to five minutes, followed by allowing said primary oil and vinegar mixture to set at rest for 20 to 25 minutes while maintaining the temperature in the range of 80° to 85° F. to extract the flavor from the fiber cells of the thyme;

(f) grinding 2.0 ounces dry weight of whole dried basil, followed by incorporating the ground basil by slow agitation into said primary oil and vinegar mixture for five to eight minutes while maintaining the temperature in the range of 80° to 85° F.;

(g) reducing the temperature of said primary oil and vinegar mixture to ambient room temperature;

(h) removing 200 ml of said primary oil and vinegar mixture obtained from steps (a) through (g) to a sterile glass container and reheating to a temperature in the range of 80° to 85° F. before adding 2.0 ounced dry weight of ground oregano to the reheated 200 ml of oil and vinegar;

(i) allowing the oil, vinegar, and oregano to set at rest without additional application of heat, for a period of 20 to 25 minutes to extract the flavor of the oregano;

(j) incorporating said 200 ml mixture of oil, vinegar, and oregano under agitation for one to two minutes into said primary oil and vinegar mixture;

(k) removing a second 200 ml portion of the oil and vinegar mixture produced by steps (a) through (j) and, after heating said second portion to a temperature in the range of 80° to 85° F., dissolving 8.0 ounces dry weight of table salt and 6.0 ounces dry weight of monosodium glutamate based flavor enhancer therein, under agitation for two to three minutes in a separate blender;

(l) forming a mixture of garlic and cheese by mixing and grinding, in a separate blender, for two to five minutes, 6.0 ounces dry weight of granulated garlic and 12.0 ounces dry weight of parmesan cheese;

(m) incorporating a preservative, in the amount of 9.125%, by dry weight of said garlic and cheese mixture by separately blending as in Step (l);

(n) simultaneously incorporating the garlic, cheese and preservative mixture and agitating for four to six minutes while maintaining a temperature in the range of 80° to 85° F.;

(o) closing the vessel and allowing the completed mixture to cool to ambient temperature;

(p) bottling and sealing the finished product according to conventional methods.

2. A salad dressing produced by the process of claim 1 wherein said oil is a soybean derivative; said vinegar is red wine vinegar; and said preservative is an extract of grapefruit seed and pulp.

* * * * *